United States Patent [19]

LaPrad et al.

[11] Patent Number: 4,845,943
[45] Date of Patent: Jul. 11, 1989

[54] CONTROL METHOD FOR TOPPING LOOP

[75] Inventors: Richard F. LaPrad, South Windsor; Gary C. Horan, West Hartford, both of Conn.

[73] Assignee: United Technologies Corporation, Hartford, Conn.

[21] Appl. No.: 188,590

[22] Filed: Apr. 29, 1988

[51] Int. Cl.[4] ............................................... F02C 9/28
[52] U.S. Cl. .................................. 60/39.03; 60/39.24; 60/39.281
[58] Field of Search ................. 60/39.03, 39.24, 39.25, 60/39.26, 39.27, 39.281, 39.282, 39.29

[56] References Cited

U.S. PATENT DOCUMENTS

| 4,040,250 | 8/1977 | Saunders et al. | 60/39.281 |
| 4,188,781 | 2/1980 | Johnson et al. | 60/39.281 |
| 4,337,615 | 7/1982 | La Croix | 60/39.281 |
| 4,380,148 | 4/1983 | Burrage et al. | 60/39.281 |
| 4,543,782 | 10/1985 | Fitzmaurice | 60/39.281 |

Primary Examiner—Louis J. Casaregola
Attorney, Agent, or Firm—Stephen E. Revis

[57] ABSTRACT

A control system, such as for a gas turbine engine, prevents a parameter from exceeding a maximum, steady state limit using a topping loop. The topping loop compares the actual value of the parameter to a transient limit which is initially somewhat lower than the steady state limit, but can vary, at a selected rate, up to a maximum of the steady state limit. The difference between the actual value and transient limit may be used to control the system as the parameter approaches the transient limit. The transient limit, and how it varies, is selected to allow a sufficiently rapid approach of the parameter toward and up to the steady state limit, without overshooting such limit.

7 Claims, 2 Drawing Sheets

CONTROL METHOD FOR TOPPING LOOP

TECHNICAL FIELD

This invention relates to control systems, such as for gas turbine engines, and other machines or processes.

BACKGROUND ART

Fuel controls for gas turbine engines operate in a closed loop fashion based upon a selected parameter, herein referred to as the primary parameter. The parameter may be a particular engine pressure ratio, compressor speed, or temperature at a selected location within the engine, such as the turbine exhaust temperature, or any other suitable parameter. Typically, a desired value of the parameter is continuously recomputed based upon throttle setting, empirically developed schedules, and other relevant information. This value is continuously compared to the actual value of the parameter; and fuel is modulated to drive the difference (i.e. error) to zero.

More specifically, when the pilot moves the throttle, the new throttle position, along with other information, is input into a control system which includes a schedule of curves for selecting an appropriate new value for the engine control parameter. The difference between the current actual value of that parameter and the value according to the control schedule is continuously calculated to produce an error term. The error term is compensated for the dynamic characteristics of the engine, and is converted to a fuel flow rate error term which, when used to control the engine, tells the engine the rate at which the fuel flow needs to be changed in order to drive the compensated error term to zero. Compensating the error term accounts for the time it takes the engine to respond physically to a change in fuel flow. Compensators are well known in the art.

While the engine is being operated based upon a primary parameter, the other parameters "float" in dependent fashion. It is desired to prevent these dependent parameters from exceeding certain Government agency certified limits. A control "topping loop" is used to accomplish this.

For example, in a twin spool gas turbine engine, there may be a Government certified steady state high pressure compressor speed ($N_2$) which should not be exceeded. This maximum speed is referred to as the $N_2$ steady state redline limit. In a prior art topping loop the difference between the steady state redline limit and the actual compressor speed is continuously calculated; and that difference or error term is passed through a compensator of the type discussed above and is converted to a compensated fuel flowrate error term. As also discussed above, a fuel flowrate error term is being continuously calculated in the primary control loop based upon primary parameter schedules. Both flowrate error terms are delivered to a select-low gate. The lowest of these flowrate error terms is thereupon used by the control to adjust the engine fuel flow.

When the engine is operating well below the $N_2$ redline limit, the topping loop flowrate error term will be very large compared to the primary parameter flowrate error term. The primary parameter error term will be selected under those circumstances. If the value of the high pressure compressor speed ($N_2$) gets close enough to the steady state redline limit, the topping loop flowrate error term will fall below that of the primary parameter flowrate error term and will be selected to control the engine fuel flow. The object is to prevent the engine control from selecting a rate of fuel flow which could cause the compressor speed to exceed the redline limit; however, in some engines this has not been possible to achieve for the entire engine operating envelope. The reason for occasional failure is that the compensator must be designed to always allow the engine to accelerate at specification minimum rates; and the control must also permit the engine to operate, at steady state, up to the redline limit. Under certain conditions, and using prior art topping loop techniques, these requirements are incompatible with avoiding exceeding the redline limit. Therefore, prior art topping loop compensators for the high pressure compressor speed error term have been designed to allow transient overshooting of the redline limits under certain circumstances. While this overshooting is brief and does not pose a safety problem, it does raise an automatic flag in the cockpit, requiring service personnel to determine whether there has been an engine malfunction. The pilot will also see this flag, and may believe there is a problem when there actually is none.

Users of engines with the prior art control system topping loops desire to eliminate this redline overshooting situation in a manner which allows the engine to meet acceleration specifications and to operate up to the redline limit during steady state operation over the entire flight envelope.

DISCLOSURE OF INVENTION

One object of the present invention is an improved topping loop for a control system.

Another object of the present invention is a topping loop which prevents a parameter from overshooting steady state limits throughout the entire range of normal operating conditions while still allowing operation of the parameter at the steady state limit when called for.

Yet another object of the present invention is a topping loop for a machine or process which prevents overshooting a parameter's steady state limit without reducing the parameter's acceleration rates to below set limits.

Accordingly, a topping loop for a control system having a constant steady state limit for a particular parameter uses a somewhat lower transient limit which is a constant as the parameter increases in value up to such lower limit, and then the topping loop increases the transient limit, at a selected rate, until the transient limit either reaches the steady state limit or until the parameter falls back to the initial lower transient limit value, whereupon the transient limit is reduced, at a selected rate, back to its initial lower limit value.

Thus, in a gas turbine engine control system, rather than continuously comparing the parameter to the steady state redline limit to determine whether and by how much the current rate of fuel flow to the engine must be adjusted to avoid overshooting the redline limit, during an acceleration the topping loop of the present invention makes comparisons between the parameter and a "transient" limit which remains at a selected constant value somewhat lower than the redline limit until the parameter increases to that constant value. At that time the transient limit increases, at a selected rate, up to a maximum value which is equal to the steady state redline limit. As soon as the actual value of the parameter falls back to the value of the initial constant transient limit value, the transient limit begins to return, at a selected rate, to that initial constant transient limit value, thereby resetting the topping loop for the next acceleration.

The rate of increase is selected to allow an engine acceleration rate which at least meets engine specifications under all normal operating conditions, but which is not so great that it would permit the critical parameter to overshoot the steady state redline limit. In accordance with a preferred embodiment of the present invention, and for purposes of simplicity, the selected rate of increase for the transient limit is a constant rate of increase; and the selected rate of decrease is the same as the selected rate of increase.

Although this invention is particularly useful in a control system for a gas turbine engine, it could just as well be used in the control system for other types of engines and apparatus, and for processes which require controlling the rate of increase of a parameter to prevent exceeding a specified steady state limit.

The foregoing and other objects, features and advantages of the present invention will become more apparent in the light of the following detailed description of preferred embodiments thereof as illustrated in the accompanying drawing.

BEST MODE FOR CARRYING OUT INVENTION

Figure 1:
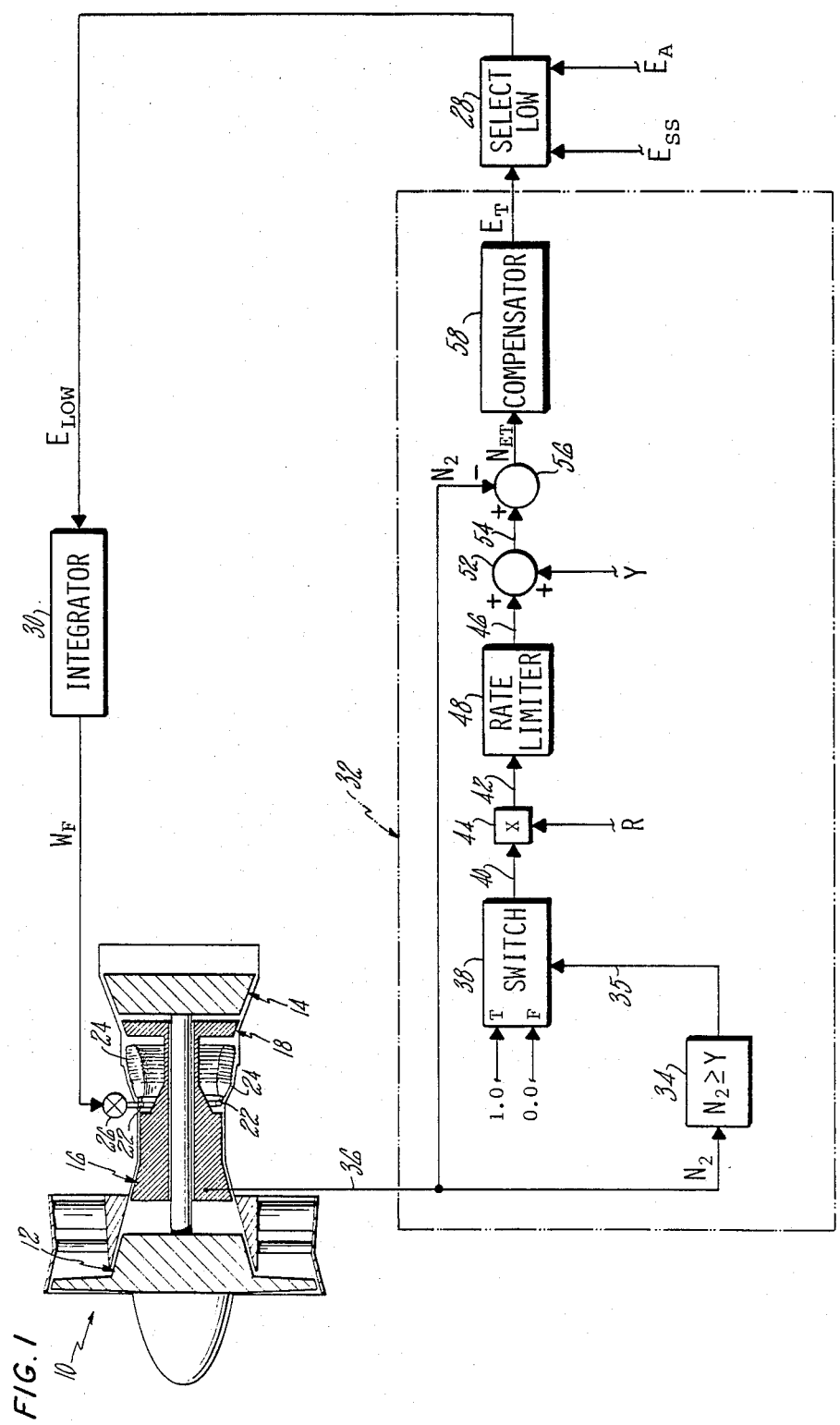
FIG. 1 is a schematic representation of a portion of a control system incorporating the features of the present invention.

As an exemplary embodiment of the present invention, consider Pratt & Whitney's PW-4000 twin spool turbofan gas turbine engine shown schematically in FIG. 1 and generally represented by the reference numeral 10. The engine comprises a low pressure compressor 12 connected through a shaft to a low pressure turbine 14; a high compressor 16 connected through a shaft to a high pressure turbine 18; and a burner section 20 disposed between the high compressor and the high turbine. A plurality of fuel nozzles 22 spray fuel into the burners 24 of the burner section 20. Fuel flow into the nozzles 22 is varied by a valve 26.

An electronic engine control automatically regulates engine operation, such as by adjusting fuel flow based upon pilot demand (throttle setting), various aircraft and engine parameters, and scientific and empirically developed relationships between various parameters. For example, during steady state operation fuel flow control is based upon engine total pressure ratio, which is the ratio of the engine outlet pressure to the engine inlet pressure. When the engine is in an accelerating mode the fuel flow is controlled based upon the derivative (i.e. the rate of change) of the high pressure compressor speed. Fuel flowrate error terms are continuously calculated for each of these operating modes. These error terms have a magnitude representative of the difference between where the engine is actually operating and where the engine should be operating based upon the control parameter associated with that mode. In other words, the magnitude of each error term is indicative of a rate of fuel flow change which, if the particular fuel flowrate error term is used by the control system to control the fuel flow to the engine, would result in a modification of the fuel flow in a manner which would drive the selected error term to zero.

In FIG. 1 a signal representative of a steady state fuel flowrate error term is designated by $E_{SS}$, and is based upon engine pressure ratio. The acceleration mode fuel flowrate error term signal is designated by $E_A$, and is based upon acceleration of the high pressure compressor speed. Both these signals pass through a select-low gate 28 along with a signal indicative of a fuel flowrate topping loop error term designated as $E_T$, based upon high pressure compressor speed ($N_2$). The smallest fuel flowrate error signal, herein designate $E_{LOW}$ is passed to an integrator 30 which sends an appropriate fuel flow signal $W_F$ to the fuel valve 26.

When the throttle is moved to accelerate the engine to a new steady state condition significantly different from a present steady state condition, initially the steady state fuel flowrate error signal $E_{SS}$ will be large relative to the acceleration fuel flowrate error signal $E_A$, and the latter will be selected over the former to control the engine fuel flow $W_F$. As the new steady state condition is approached, eventually $E_{SS}$ will become smaller than $E_A$ and will be used to control the fuel flow until a new throttle setting is selected, unless $E_T$ becomes smaller than either $E_A$ or $E_{SS}$, during which time $E_T$ will be used to control the engine fuel flow $W_F$.

Figure 2:
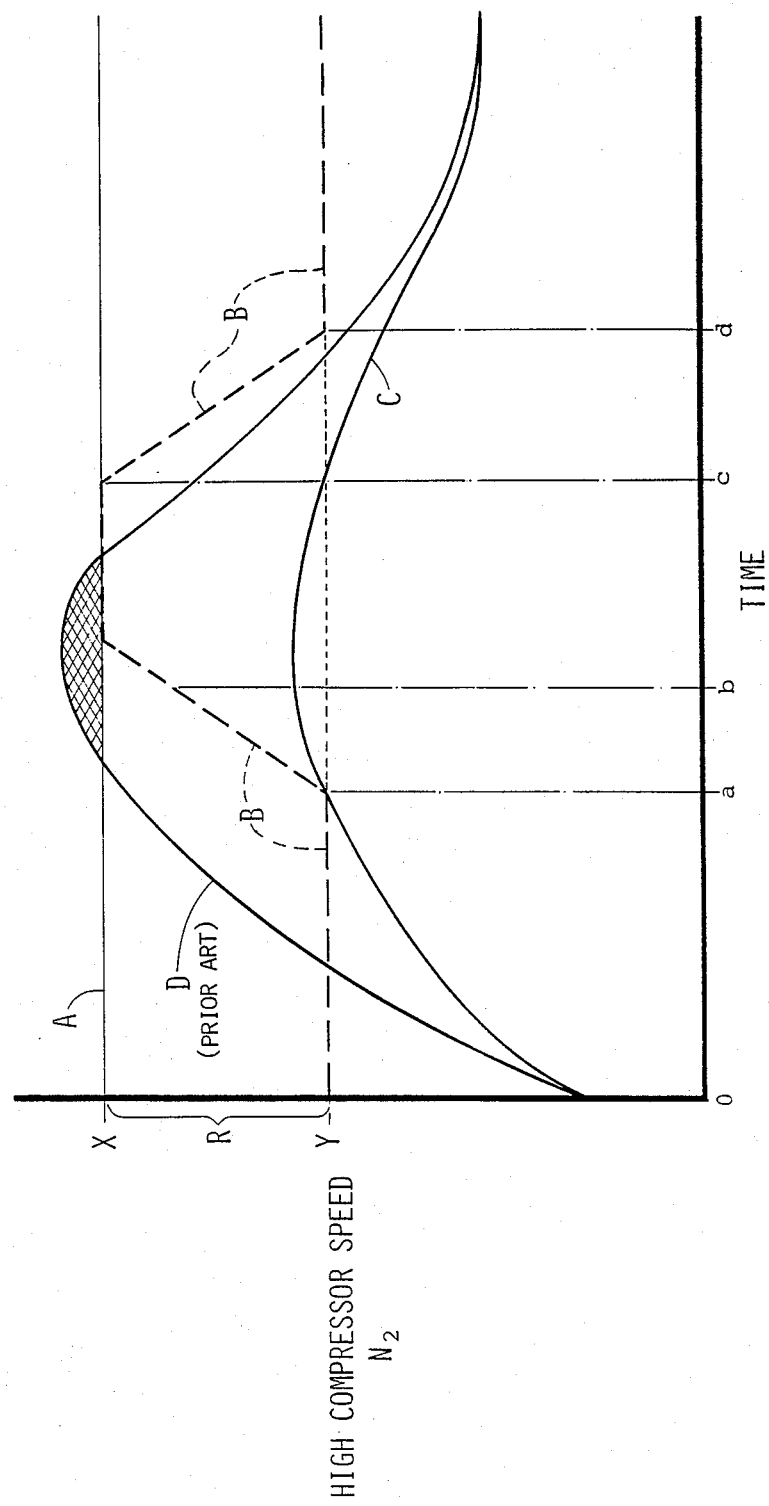
FIG. 2 is a graphical representation of the control loop of the present invention compared to that of the prior art.

In this exemplary embodiment the high pressure compressor speed, $N_2$, floats as the engine is controlled by either $E_{SS}$ or $E_A$; however, there is a steady state redline limit for $N_2$, and this limit is represented in the graph of FIG. 2 by the horizontal line A at an RPM of X. For a turbofan engine such as Pratt & Whitney's PW-4000, X is about 10,000 RPM. In accordance with the present invention, a lower transient limit value is selected for the parameter $N_2$, and that lower limit is Y. As shown on the graph of FIG. 2, Y is R less than X. For the PW-4000 engine, R is 35 RPM.

Referring to FIG. 1, a topping loop for the engine is designated generally by the reference numeral 32. In the topping loop 32, a comparator 34 receives a signal 36 indicative of the actual value of the high pressure compressor rotor speed $N_2$. If $N_2$ is greater than or equal to Y, which is the selected lowest value for the transient limit, a "true" signal 35 is sent to a switch 38. If the statement in the comparator is false, a "false" signal is sent to the switch 38. When the statement is true the switch output 40 is equal to 1.0 and when the statement is false the switch output 40 is 0.0.

The output 40 is multiplied by R in the multiplier 44, and the product 42, which will be either 0.0 or R, is delivered to a rate limiter 48. For purposes of explanation, assume the input 42 suddenly changes from 0.0 to R. If the rate limiter output 46 is 0.0 at the time the input 42 changes from 0.0 to R, the rate limiter output will start to increase in value, at a selected rate, from 0.0 to a maximum which is the value of the input 42; and it will remain at that maximum value, after reaching it, as long as the input 42 remains constant.

When the input 42 changes from R back to 0.0, if the output 46 at the moment of change is other than 0.0, the rate limiter will immediately begin to reduce its output, at a selected rate, to a minimum value of 0.0. A change, again, of the input 42 to a value R will again serve to cause the output 46 to increase, at the selected rate, up to a maximum value of R. In this exemplary embodiment, which is of the PW-4000 engine, the selected rates of increase and decrease are the same and are constant at 11.5 RPM per second.

The lowest value, Y, of the transient limit is added to the output 46 of the rate limiter in the adder 52. The output 54 from the adder 52 now represents the transient limit for $N_2$ at the time of each calculation by the topping loop 32. The difference between the transient limit value 54 and the actual value of the high pressure compressor speed $N_2$ is calculated in a subtractor 56. The output $N_{ET}$ is a signal indicative of the high pressure compressor speed error term.

A compensator 58 adjusts the output $N_{ET}$ for dynamics characteristics of the engine and converts it into a fuel flowrate error term signal $E_T$ which, if used to control the fuel flow to the engine, would tend to drive the compensated compressor speed error term to zero.

As shown in the drawing, the topping loop flowrate error term signal $E_T$ is delivered to the select-low gate 28 along with the steady state and acceleration flowrate error term signals $E_{SS}$ and $E_A$, respectively. Thus, in the event that the high pressure compressor speed gets so close to the redline limit X that it might exceed the redline limit if the engine continued to operate based upon its steady state or acceleration schedules, the select-low gate 28 would pass E and thereby avoid such an occurrence.

Operation of the topping loop 32 will now be explained with reference to FIG. 2. The curve D is representative of prior art engine operation. In the prior art the topping loop error term is always calculated based upon the difference between the actual compressor speed and the redline limit X. Despite dynamics compensation, it was necessary to allow the compressor speed to overshoot (cross hatched area) the redline limit under certain operating conditions, for reasons which have already been discussed in the Background Art portion of the specification.

The curve C represents the compressor speed for the same engine, under the same operating conditions, leading to the same steady state value for the compressor speed, except the topping loop is in accordance with the present invention. The curve B, shown as a broken line, represents the transient limit. Starting at the left end of the curve C at time 0, the transient limit against which the actual compressor speed is continuously compared remains at a constant value Y until time "a", at which time $N_2$ becomes equal to Y. At that point the rate limiter 48 begins receiving a signal equal to R and starts increasing or ramping up the transient limit, until the transient limit reaches the redline limit X, or until $N_2$ is no longer greater than or equal to Y, which ever occurs first. In the example of FIG. 2, this event occurs at time "c", but it might, under other circumstances, have occurred at time "b", before the transient limit reached a value of X. In either event, as soon as the compressor speed $N_2$ falls below the value Y, the rate limiter output starts to decrease or ramp down from its then current value until it reaches 0.0 (which occurs at time "d" in the example) or until the compressor speed again reaches the value Y, whichever occurs first.

In this exemplary embodiment the transient limit is increased and decreased at the same constant rate; however, this is not essential. The rates of increase and decrease may be different from each other, and they need not be constant rates.

For the PW-4000 engine the 11.5 RPM per second rates of increase and decrease were selected empirically in conjunction with the selection of 35 RPM for R, the object being to prevent overshooting without reducing acceleration rates to below minimum required levels.

Also, in this embodiment, the topping loop parameter is high pressure compressor speed; however, the present invention is useful to prevent exceeding a steady state redline limit for virtually any parameter. And a topping loop according to the present invention can be used in a control system for virtually any apparatus or process.

Although the invention has been shown and described with respect to an exemplary embodiment thereof, it should be understood by those skilled in the art that other various changes and omissions in the form and detail of the invention may be made without departing from the spirit and scope thereof.

We claim:

1. In the topping loop of a control system for an engine, wherein a first parameter for the engine is not to exceed a specified steady state redline limit during operation of the engine, the process for determining a topping loop error term for use by the control system comprising the steps of:

continuously determining the difference between the actual value of said first parameter and a transient limit for said parameter, wherein said difference is a first parameter error term;

maintaining the transient limit at a constant value which is below the steady state redline limit until said first parameter actual value increases to said constant value;

increasing the transient limit, at a selected rate, up to a maximum value equal to the steady state redline limit upon said first parameter actual value reaching said constant value; and decreasing the transient limit, at a selected rate, to no less than said constant value upon said first parameter actual value returning to below said constant value.

2. The process for determining the topping loop error term according to claim 1, wherein the selected rate of increase is a constant rate of increase and the selected rate of decrease is a constant rate of decrease.

3. The process for determining the topping loop error term according to claim 2, wherein said selected rate of increase and selected rate of decrease are the same.

4. The process for determining the topping loop error term according to claim 1, including the steps of compensating said first parameter error term for the dynamic characteristics of the engine and converting said compensated error term to a fuel flowrate error term indicative of a rate of engine fuel flow change which would drive the compensated error term to zero.

5. The process for determining the topping loop error term according to claim 1, wherein the control system is for a gas turbine engine having a compressor, and said first parameter is compressor speed.

6. In a control system for a gas turbine engine wherein a plurality of fuel flowrate error terms are generated, each based upon a different engine parameter, wherein one of said error terms is a topping loop fuel flowrate error term which is based upon a first parameter, and wherein the lowest of said plurality of error terms is selected to control the rate of fuel flow change to the engine, the process of generating said topping loop fuel flowrate error term comprising:

continuously determining the difference between the actual value of said first parameter and a transient limit for said first parameter, and for generating a first error term having a value indicative of said difference;

maintaining the transient limit at a constant value which is below a maximum allowed constant steady state value until said first parameter value increases to said transient limit constant value;

increasing the transient limit, at a selected rate, up to a maximum, value equal to the maximum allowed steady state value upon said first parameter value increasing to said transient limit constant value;

decreasing the transient limit, at a selected rate, to no less than said transient limit constant value upon said first parameter value decreasing to less than said transient limit constant value;

compensating said first error term for dynamic characteristics of the engine; and converting said compensated error term to a topping loop fuel flowrate error term indicative of a rate of engine fuel flow change which would drive said compensated error term to zero.

7. The process according to claim 6, wherein the first parameter is engine compressor speed.

* * * * *

UNITED STATES PATENT AND TRADEMARK OFFICE
CERTIFICATE OF CORRECTION

PATENT NO.  : 4,845,943

DATED       : July 11, 1989

INVENTOR(S) : Richard F. LaPrad and Gary C. Horan

It is certified that error appears in the above-identified patent and that said Letters Patent is hereby corrected as shown below:

Column 3, line 41:  before "connected" change "!2" to "12"

Column 5, line 23:  after "pass" change "E" to "$E_T$"

Signed and Sealed this

Twenty-second Day of May, 1990

Attest:

HARRY F. MANBECK, JR.

Attesting Officer          Commissioner of Patents and Trademarks